United States Patent
Han et al.

(10) Patent No.: US 12,096,343 B2
(45) Date of Patent: Sep. 17, 2024

(54) EVALUATING CELLULAR CHANNELS

(71) Applicant: HEWLETT PACKARD ENTERPRISE DEVELOPMENT LP, Houston, TX (US)

(72) Inventors: Jianpo Han, Beijing (CN); Hao Lu, Santa Clara, CA (US); Guojun Zhang, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 260 days.

(21) Appl. No.: 17/389,587

(22) Filed: Jul. 30, 2021

(65) Prior Publication Data
US 2023/0033746 A1   Feb. 2, 2023

(51) Int. Cl.
H04W 48/16 (2009.01)
H04W 24/10 (2009.01)
H04W 48/18 (2009.01)
H04W 72/541 (2023.01)
H04W 72/542 (2023.01)

(52) U.S. Cl.
CPC ........... *H04W 48/16* (2013.01); *H04W 24/10* (2013.01); *H04W 48/18* (2013.01); *H04W 72/541* (2023.01); *H04W 72/542* (2023.01)

(58) Field of Classification Search
None
See application file for complete search history.

(56) References Cited

U.S. PATENT DOCUMENTS

| | | | | |
|---|---|---|---|---|
| 6,052,590 A * | 4/2000 | Hicks | ............ | H04W 48/18 455/168.1 |
| 10,039,043 B2 | 7/2018 | Zhang et al. | | |
| 10,492,045 B2 | 11/2019 | Li | | |
| 2004/0264609 A1* | 12/2004 | Santhoff | ............ | G01S 13/878 375/346 |
| 2015/0126207 A1* | 5/2015 | Li | ............ | H04W 16/14 455/452.1 |
| 2016/0095113 A1* | 3/2016 | Choi | ............ | H04W 24/10 370/336 |
| 2021/0360719 A1* | 11/2021 | Kwan | ............ | H04W 8/183 |
| 2022/0225225 A1* | 7/2022 | Cui | ............ | H04W 48/18 |

OTHER PUBLICATIONS

DIGI International Inc., "DIGI EX50," Preliminary Datasheet, May 13, 2021, 4 pages, https://www.digi.com/products/models/ex50-wxs6-glb.
Nokia, "Nokia and Zain KSA Smarten Up Saudi Homes and Offices with 5G-powered FWA and Wi-Fi 6," Press Release, Jan. 6, 2021, https://www.nokia.com/about-us/news/releases/2021/01/06/nokia-and-zain-ksa-smarten-up-saudi-homes-and-offices-with-5g-powered-fwa-and-wi-fi-6/.

* cited by examiner

*Primary Examiner* — Alex Skripnikov
*Assistant Examiner* — Angelie T Ngo
(74) *Attorney, Agent, or Firm* — Hewlett Packard Enterprise Patent Department

(57) ABSTRACT

Examples include scanning for cellular channels from various cellular service providers. Identifying cellular channels corresponding to cellular service providers. Recording a set of operating parameters for the cellular channels. Evaluating the cellular channels based on the set of operating parameters. Sorting the cellular service providers based on the evaluation of the cellular channels.

18 Claims, 7 Drawing Sheets

EVALUATING CELLULAR CHANNELS

BACKGROUND

With the proliferation of network technologies, network devices such as access points have become popular for bringing convenience to users. Users may connect client devices to an access point, which may further connect to a network or the internet to send and receive data.

BRIEF DESCRIPTION OF THE DRAWINGS

These and other features, aspects, and advantages of the present subject matter will become better understood when the following detailed description is read with reference to the accompanying drawings in which like characters represent like features throughout the drawings, wherein.

Figure 1A:
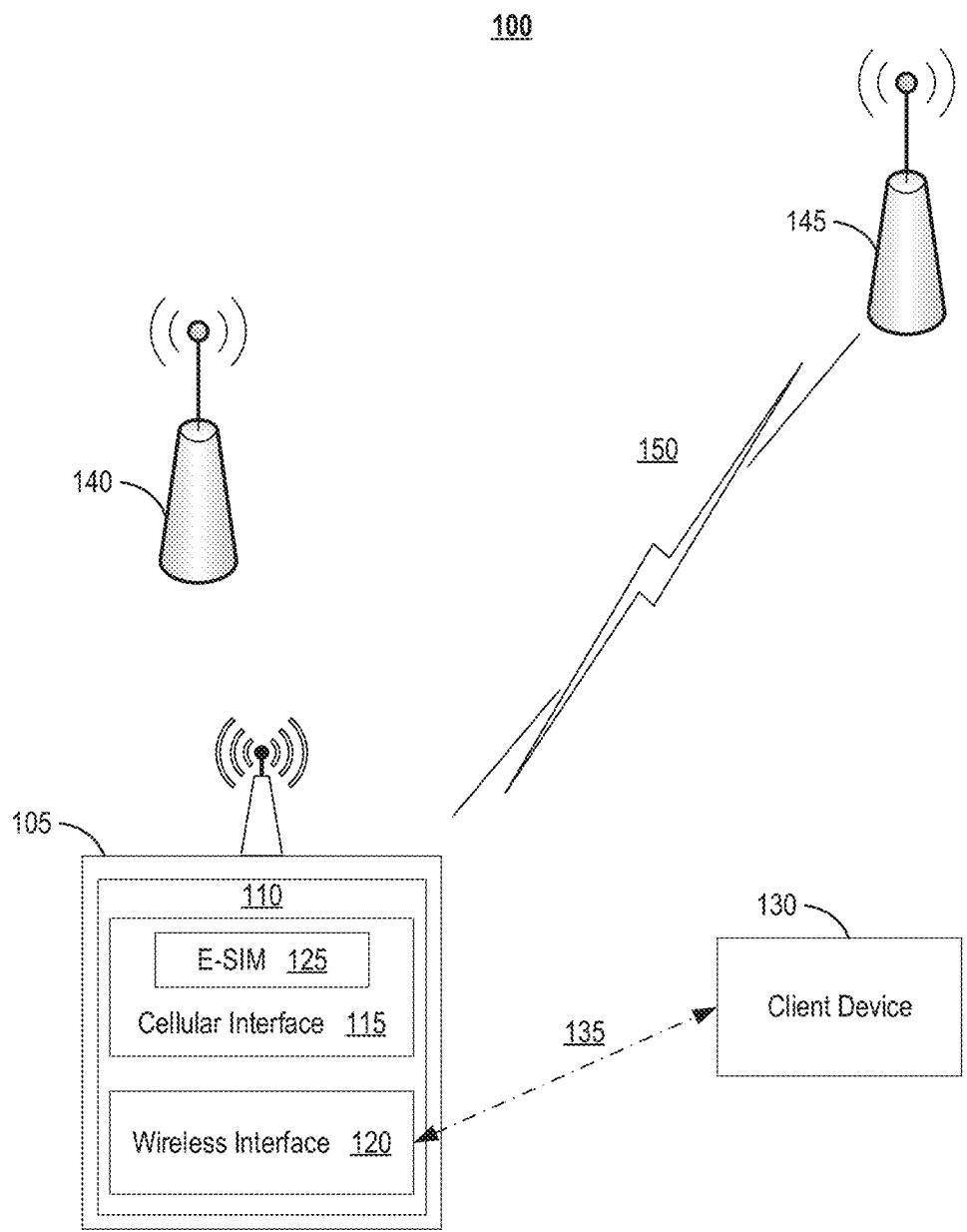
FIG. 1 illustrates a schematic view of an access point in a network environment, in accordance with an example of the present subject matter.
FIG. 1B illustrates a flow chart depicting an example method of operation of an access point, in accordance with the present subject matter.

It is emphasized that, in the drawings, various features are not drawn to scale. In fact, in the drawings, the dimensions of the various features have been arbitrarily increased or reduced for clarity of discussion.

DETAILED DESCRIPTION

An Access Point (AP) may include an electronic device that may be capable of transferring information between a network and client devices. An AP may include a wireless radio that enables client devices to connect wirelessly to the AP. Client devices may include but not limited to network devices, computing devices, internet of things (IoT) devices, etc. The wireless radio may include a combination of hardware and software and may be developed based on a technical standard (e.g., Institute of Electrical and Electronics Engineers (IEEE) 802.11ax, IEEE 802.15.1, IEEE 802.15.4, etc.). Based on supported technical standard(s), client devices may connect to a wired or wireless network via an AP.

Some APs may further include a cellular radio for leveraging communication services offered by cellular service providers. For example, an AP may include Subscriber Identify Module (SIM) capability that allows a user with a SIM card to connect to a cellular network. Generally, a user has to obtain a physical SIM card and install it in the AP to avail cellular services. In some APs, a stand-alone or an additional embedded-SIM (e-SIM) capability may be provided. e-SIM enables a user to take advantage of high-performance cellular networks, without the hassles associated with the use of a physical SIM. In addition, a user may have the freedom to select and register with a cellular service provider from available service providers, with the advantage of remote activation.

Generally, a cellular service provider may operate in a certain frequency band. With the advent of various technology standards (e.g., 3G, 4G, 5G, etc.) for cellular networks, various cellular providers operate in a wide spectrum of frequencies. Some of these frequencies may interfere with a wireless radio (e.g., Wi-Fi, Zigbee, Bluetooth, etc.) provided in an AP, causing noise and/or scattering of signals. For instance, certain 5G frequency bands may operate dose to frequencies used by Wi-Fi radio(s) in APs. 5G frequency bands, such as n41, n40, and n30, may operate from 2.3 GHz to 2.6 GHz range, which may be dose to an operating frequency of Wi-Fi, Zigbee, or Bluetooth radios that may operate at 2.4 GHz. In some other examples, certain cellular networks (e.g., Universal Mobile Telecommunications System, Global System for Mobile Communications, etc.) may operate below 1 GHz frequency bands that may interfere with operating frequencies of wireless communication protocols such as Z-wave radio, which is used automation application. Due to poor isolation between these frequencies/frequency bands, interference may occur between radios (i.e., cellular and Wi-Fi/Bluetooth/Zigbee/Z-Wave radios) disrupting communication occurring through cellular channels and wireless channels. The cellular standards and short-range wireless communication standards are ever-evolving, which may lead to more cellular frequency bands interfering with wireless radio communication. Moreover, power emitted by a cellular radio may be higher than a wireless radio. Any power leakage from a cellular channel may affect wireless channels thereby affecting communication between client devices and an AP.

Further, a user may not be aware of the availability of cellular service providers, and other associated parameters such as signal strength of a channel, frequency of operation of a cellular channel, etc. Consequently, a user may not be in a position to select a cellular service provider with a low-noise or noise-less network experience. Moreover, cellular service providers and associated parameters such as frequency band, signal strength, etc. may vary from one location to another location. A single telecom service provider may not be in a position to provide a desired network experience (e.g., strong signal, low interference, etc.) to a user all the time.

Examples disclosed herein address the aforementioned technical shortcomings by evaluating and sorting a list of cellular service providers based on an order of preference. The list of cellular service providers may be presented to a user by determining the most preferred cellular service providers. The cellular service providers may be sorted in the order of preference to work in conjunction with a wireless interface. For example, the order of preference may include one or more cellular service providers that are evaluated for better network experience. The wireless interface may include a short-range communication interface, such as Wi-Fi, Zigbee, etc., used for communicating with client devices.

In some examples, a network device (e.g., an AP) with embedded-SIM may scan and identify available cellular service providers. The network device may communicate with a client device, such as portable devices, computing devices, other network devices, IoT devices, etc. through a wireless interface. For the identified cellular service providers, a set of operating parameters such as signal strength, channel operating frequency, etc. may be recorded. Evaluating cellular service providers (CSPs) for interference may be performed based on the recorded operating parameters. In some examples, CSPs may be evaluated based at least in part on a channel interference between a channel operating frequency of a CSP and a wireless operating frequency of a wireless interface. Based on a determination of the channel interference, the CSPs may be sorted. Sorting of CSPs may be performed based on a channel operating frequency and/or signal strength, to create a preference record. A user may be provided with an option to select the most preferred CSP with minimal or no interference.

Accordingly, the examples discussed herein automatically determines for a user, cellular service providers with low interference based on local characteristics of an AP and specific characteristics such as a cellular frequency of the CSPs that are available. Examples described herein allow a user to leverage the advantages offered by a cellular link for connecting to a network or for transmitting data with minimal or no loss of data. Certain CSPs having a strong signal or with a base station dose to a user may be evaluated as low preference CSPs as they might be operating in frequency bands that might disrupt or interfere with wireless bands. If a user moves to a new location, a user may have the option to register with a new CSP. Thus, evaluation of CSPs at a new location may be performed based on CSPs that are available to determine CSFs that are most preferred to work in conjunction with a wireless interface. In some further examples, a preference record may be created and communicated to a user device for selection and registration with a CSP from the preference record.

In some examples, an access point is provided with a non-transitory machine-readable storage medium comprising instructions executable by a processor. The instructions may include instructions to scan for cellular channels from various CSPs. Additionally, the storage medium may include instructions to identify the cellular channels corresponding to the CSPs. The storage medium also includes instructions to record a set of operating parameters for the cellular channels. The storage medium may also include instructions to evaluate the cellular channels based on the set of operating parameters. Instructions to sort the CSPs based on the evaluation, for selection by a user.

The following detailed description refers to the accompanying drawings. Wherever possible, the same reference numbers may be used in the drawings and the following description to refer to the same or similar features. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Referring to the figures, FIG. 1A illustrates a schematic view of an access point 105 in a network environment 100, in accordance with an example of the present subject matter. The access point (AP) 105 may include a communication interface device 110. The communication interface device 110 may include a cellular interface 115 and a wireless interface 120. In some examples, the wireless interface 120 may include an IEEE 802.11 standard (e.g., Wi-Fi interface). In other examples, the wireless interface may include other protocols used for wireless communication, including but not limited to IEEE 802.15.1, IEEE 802.15.4, or other short-range wireless technology protocols. Through the wireless interface 120, a client device 130 may be communicatively connected to the AP 105 via a wireless channel 135. The wireless interface 120 may include one or more antennas (not shown) for communicating with the client device 130. Herein, the term 'interface' may include a physical radio, software, hardware, firmware, circuitry, or a combination thereof. In some examples, it may include an electronic device with trans-receiving capability that enables the access point 105 to perform cellular/wireless communication-related actions such as sending and receiving signals/data over.

The access point 105 described herein may provide a point of access to the network established in the network environment 100. Access point 105 may control network access of the client device 130. In further examples, the access point 105 may authenticate the client device 130 for connecting to the access point 105 and through the access point 105, to other devices within network environment 100.

In some examples, access point 105 may be a combination of hardware, software, and/or firmware that is configured to provide wireless network connectivity to wireless client devices. In further examples, the access point 105 may be configured and managed by a management node (not shown). In other examples, the access point 105 may be managed and configured by an external controller (not shown). Access point 105 may communicate with the external controller and the network over connections, which may be either wired or wireless interfaces.

In further examples, the access point 105 may include additional IoT radio components capable of communicating with IoT client devices using IoT protocols not shown in FIG. 1. The access point may further include radio components, a Bluetooth radio component, a cellular radio component such as the cellular interface 115, etc. In some examples, IoT client devices and AP 105 may be deployed in remote or edge locations. IoT devices may take advantage of high-speed uplink through the cellular interface 115 having minimal noise, for effective data transfer.

The cellular interface 115 may be used by the AP 105 to establish a high-speed cellular link with any of the available cellular service providers. The AP 105 includes an embedded-SIM (e-SIM) 125 that may be integrated with the cellular interface 115. In other examples, the e-SIM 125 may be independently provided and configured to work in conjunction with the cellular interface 115. The cellular interface 115 may include one or more components used for communicating with cellular service providers (CSPs). The network environment 100 may include one or more CSPs. In other words, AP 105 may be located (i.e., physical/geographical location of AP)) in an area where CSPs provide cellular service. In one example, the cellular interface 115 of the AP 105 may be configured to scan for cellular channels within a scanning range (e.g., scanning radius around the AP) thereof. Thus, herein, the "location of AP" may refer to a geographical region within the scanning range of the AP 105. As discussed herein, the AP 105 may determine a CSP for a user to select based on evaluation of the available cellular channels. In one example, the determined CSP may be a most preferred CSP from the available CSPs.

Figure 1B:
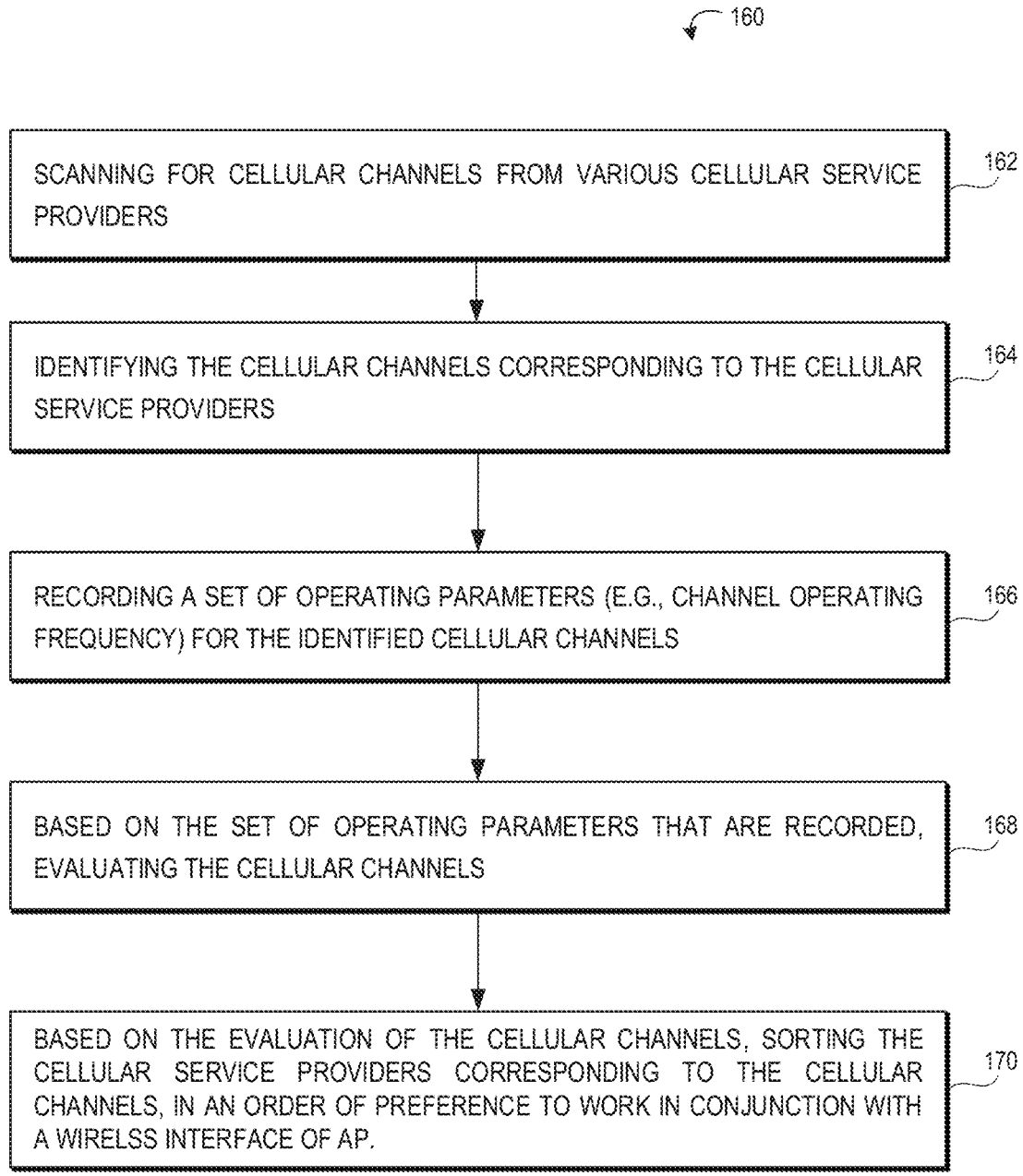

FIG. 1B illustrates a flow chart 160 depicting an example method of operation of the access point 105. At block 162, the method 160 may include scanning for cellular channels from various CSPs. The cellular interface 115 of the AP 105 may perform the scanning. At block 164, the method 160 may include identifying the cellular channels corresponding to the CSPs based on scanning operation for the cellular channels. At block 166, the method 160 may include recording a set of operating parameters for the identified cellular channels. For example, the set of operating parameters may include a channel operating frequency. At block 168, based on the set of operating parameters that are recorded, the method 160 may include evaluating the cellular channels that may be performed by the AP 105. At block 170, based on the evaluation of the cellular channels, the method 160 may include sorting of the CSPs corresponding to the cellular channels may be performed by the AP 105. The sorting of the CSPs may be in an order of preference so that the cellular connection with the particular CSP works in conjunction with the wireless interface 120 of the AP 105 with minimal or no interference. The order of preference may have CSPs sorted starting with most preferred CSP and ending with least preferred CSP, in terms of network experience. In some examples, the network experience may be defined based on channel interference, signal strength, etc.

In the illustrated example of FIG. 1A, two CSPs 140, 145 may be available and their base stations are schematically illustrated. CSPs 140, 145 may have a pre-defined coverage area around the base stations for providing cellular service to users within that geographical area. In one example, the AP 105 may scan for cellular channels. In some examples, scanning operation may include performing a passive scan for available cellular channels in the current regulatory domain of the AP 105. The AP 105 may scan for selected frequency bands that are allowed to operate, based on the regulatory domain. In other words, the cellular interface 115 may listen to beacons or similar signals/packets on various frequency bands. Alternatively, other scanning processes may be used for scanning cellular channels. The AP may identify two CSFs 140, 145 based on the identification of their cellular channels. In some examples, identifying process may include receiving a beacon or similar signal on a frequency band and thereby identifying the availability of base station (i.e., cellular service). In some examples, the AP may create an entry for each cellular channel and corresponding CSP, which are identified to be available. The AP 105 may record a set of parameters including a channel operating frequency, a signal strength, etc. for each cellular channel. Based on the set of parameters that are recorded, the AP 105 may evaluate the cellular channels. For example, the AP 105 may evaluate and determine the interference of each of the cellular channels with the wireless interface 120.

The AP 105 may sort the CSPs 140, 145 based on the evaluation. The AP 105 may create a preference record comprising the list of CSFs sorted in an order of preference. In one example, a first CSP 140 may be located dose to the AP 105 and a second CSP 145 may be located farther from the AP 105 as compared to the first CSP 140. The preference record may have the second CSP 145 listed first in the order of preference based on the evaluation. The first CSP 140 may be listed later in the order of preference despite its base station being closer to AP 105. From the preference records, a user may select the most preferred CSP (i.e., the second CSP 145 as per examples discussed in FIG. 1). The AP 105 connects to the CSP 145 through a cellular channel 150 and takes advantage of network and data services thereof. For example, a user may register the device (i.e., AP 105) with the most preferred CSP that is evaluated and determined for the user by the AP 105. Accordingly, a user may experience a rich network experience with minimal noise, scatter, and loss of data. Evaluation and sorting of cellular channels is further discussed in later examples.

The e-SIM 125 may enable a user to use the AP 105 out of the box, without the hassles of obtaining and installation of physical SIM. The AP 105 may ensure that user experiences minimal or no noise, and minimal or no disruption of service. The service herein may refer to communication/data service between the client device 130 and the AP 105, and the AP 105 and a CSP, as per some examples.

In various examples discussed herein, a user may follow instructions provided by the corresponding CSP for remote activation of cellular service. Further, the AP 105 may include a physical SIM compatibility alongside the e-SIM 125. Users may use physical SIM and operate features of physical SIM independent of the e-SIM 125.

Figure 2:
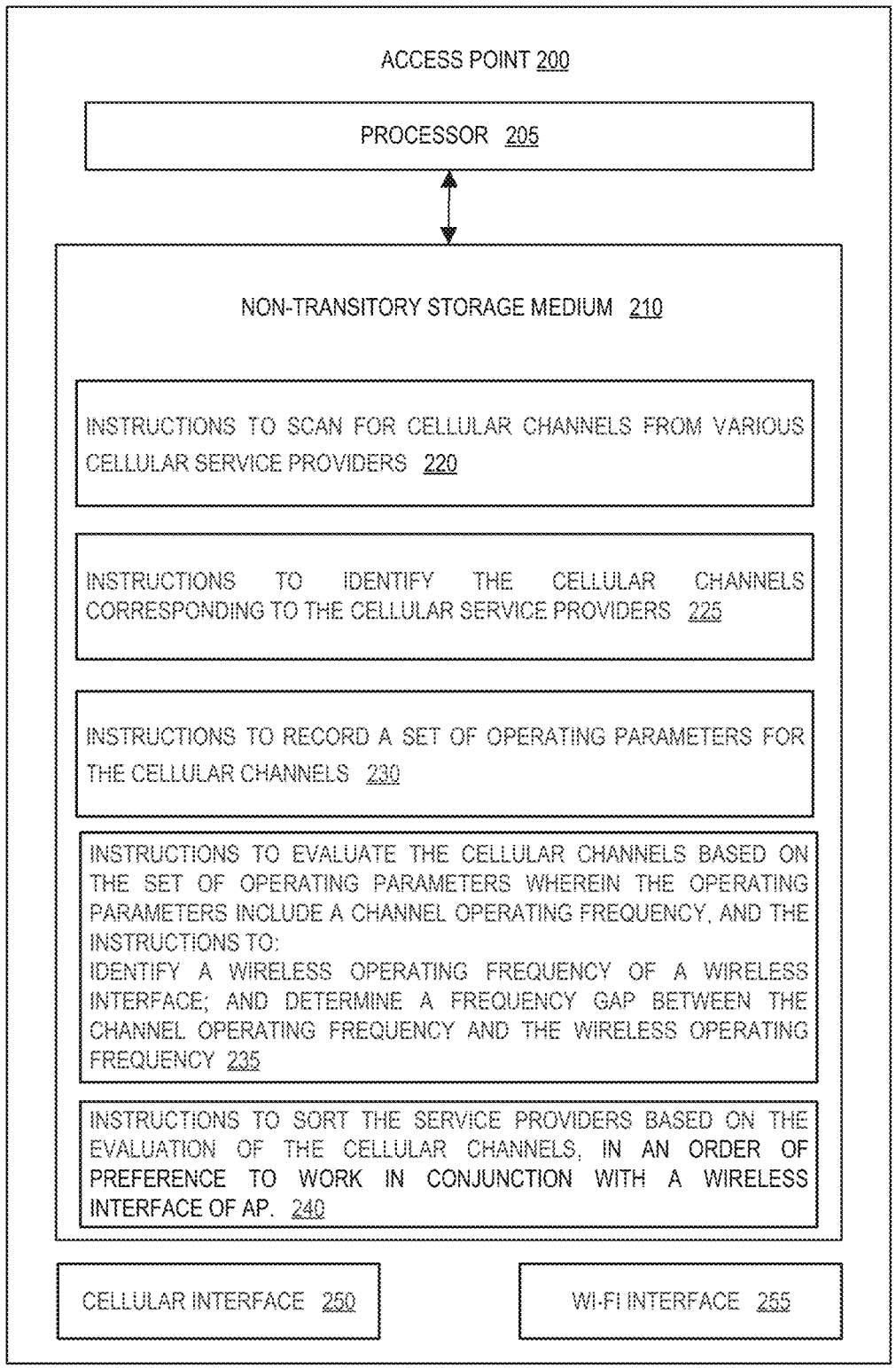
FIG. 2 illustrates an example schematic block diagram of an access point, in accordance with the present subject matter.

FIG. 2 illustrates an example schematic block diagram of an access point 200, in accordance with the present subject matter. In some examples, the access point 200 may include a processor 205 and a machine-readable storage medium 210. Machine-readable storage medium 210 may be in the form of non-transitory machine-readable storage medium, such as suitable electronic, magnetic, optical, or other physical storage media. The machine-readable storage medium 210 may be encoded with executable instructions 220-240 to perform one or more methods discussed herein. The processor 205 may fetch, decode, and execute instructions 220-240 as described herein. In some examples, the AP 200 may include a cellular interface 250 and a Wi-Fi interface 255, which may be part of a communication interface device of the AP 200. The Wi-Fi interface 255 is an example of a wireless interface. In some other examples, interface 255 may be another type of wireless interface other than a Wi-Fi interface, including a short-range communication interface including but not limited to a Zigbee interface, a Bluetooth interface, a Z-Wave interface, other interfaces used in IoT communications, etc.

In some examples, processor 205 may fetch, decode, and execute instructions 220 to scan for cellular channels from various cellular service providers. The scan operation may be performed for the out-of-box operation of the access point 200, during a reset of the access point 200 by a user, or during a change in location of access point 200. In some examples, the processor 205 may execute instructions to perform a passive scan for available cellular channels in a location of the access point 200.

In some examples, processor 205 may fetch, decode, and execute instructions 225 to identify cellular channels corresponding to a cellular service provider of access point 200. In some examples, a cellular interface, such as the cellular interface 115 of FIG. 1, may receive beacons on certain frequency bands, that may indicate the availability of a base station. The instructions to identify may also include instructions to create a record (e.g., a CSF record 305, which is later discussed in FIG. 3A) and creating an entry for each of the CSP corresponding to the identified cellular channels.

In some examples, processor 205 may fetch, decode, and execute instructions 230 to record a set of operating parameters for each of the cellular channels. The set of operating parameters may include but are not limited to, a signal strength of the channel and a channel operating frequency. Hereinafter, "signal strength of the channel" may be interchangeably referred to as "signal strength" for brevity. For example, the signal strength of the channel may be measured in terms of Received Signal Strength Indicator (RSSI). The signal strength may be a measure of power output as received by a cellular interface, such as the cellular interface 115 of FIG. 1, from a base station. For example, four cellular service providers may be available to provide cellular service to the access point 200. For each of the four cellular service providers, signal strength, channel operating frequency, etc. may be recorded in a CSP record. In some examples, instructions to record may include instructions that may be executable by processor 205 to measure various parameters. The channel operating frequency may include a frequency band, which is part of an electromagnetic spectrum used for transmitting and receiving data/signals. The channel operating frequency may be referred to by a center frequency and a bandwidth may indicate upper and lower frequency limits from the center frequency. Some standards may have frequency bands operating between 450 Mhz to 6 GHz. For example, 5G NR standard (e.g., n32, n40, or n41) and 4G LTE standard (e.g., Band 41) may have frequency bands operating between 2.3 and 2.6 Ghz. In some other examples, certain standards, such as 2G, 3G, 4G LTE, and 5G, may have frequency bands operating below 1 Ghz, such as 850 Mhz.

In some examples, processor 205 may fetch, decode, and execute instructions 235 to evaluate the cellular channels based on the set of operating parameters. Evaluation of the cellular channels may include comparing a channel operating frequency (i.e., first operating parameter) with a frequency of operation of the Wi-Fi interface 255. For example, the Wi-Fi interface 255 may operate in frequency bands such as 2.4 GHz, 5 GHz, 6 GHz, etc. In some examples, instructions to evaluate may include instructions to determine and identify cellular channels with minimal, or no interference. The cellular channels may be further evaluated.

For example, cellular channels may be evaluated based on criteria that a channel operating frequency (i.e., first operating parameter) satisfies an interference threshold. The cellular channels may be compared based on signal strength (i.e., second operating parameter). In some further examples, additional operating parameter(s) may be considered in addition to the first operating parameter and the second operating parameter discussed herein.

In some examples, processor 205 may fetch, decode, and execute instructions 220 to sort the cellular service providers based on the evaluation of the cellular channels, in an order of preference to work in conjunction with a Wi-Fi interface of AR. For example, the order of preference of cellular service providers may be presented to a user for selection of a cellular service provider therefrom. The cellular service providers may be sorted based on one or more techniques for evaluation as discussed herein. For example, a user may be provided with the order of preference of the cellular service providers on an application running on a mobile device or user device.

In some examples, a user may be provided with an option to initiate actions to fetch, decode, and execution of instructions 220-240 from a user interface (UI) whereby access point 200 performs appropriate actions. An application compatible with a portable device, such as a mobile phone, may be used by a user for the initiation of this process. In further examples, the access point 200 may be configured to perform automatic initiation and performance of one or more instructions out of instructions 220-240, after powering up, boot up, or through a manual or condition-based trigger.

As used herein, "machine-readable storage medium" may include a storage drive (e.g., a hard drive), flash memory, Random Access Memory (RAM), any type of storage disc (e.g., a Compact Disc Read-Only Memory (CD-ROM), any other type of compact disc, a DVD, etc.) and the like, or a combination thereof. A storage medium may correspond to memory including a main memory, such as a Random-Access Memory, where software may reside during runtime, and a secondary memory. The secondary memory can, for example, include a non-volatile memory where a copy of software or other data is stored.

Figure 4A:
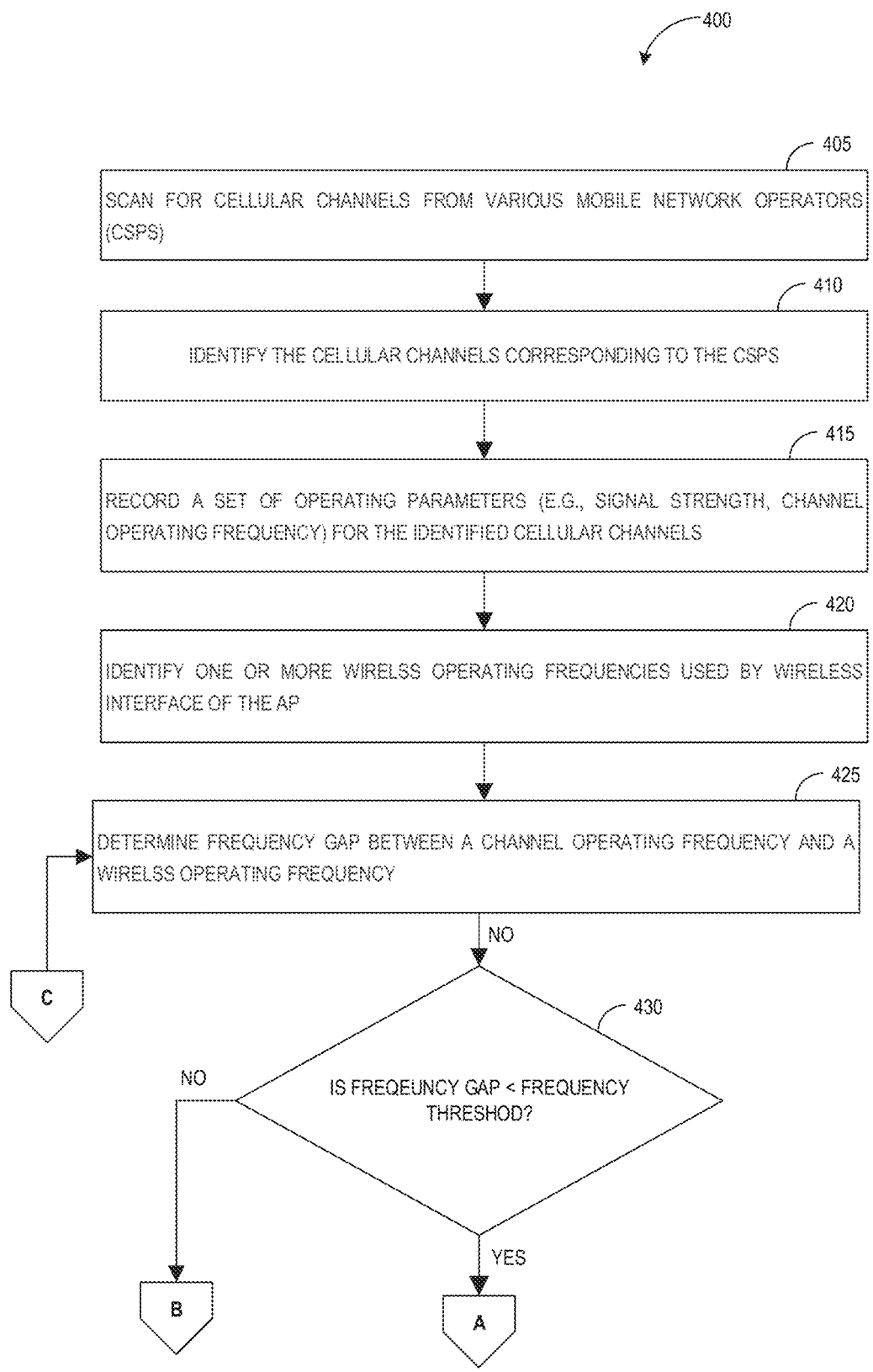
FIG. 4A illustrates an example flow diagram for a method of operation of AP, in accordance with the present subject matter.
Figure 4B:
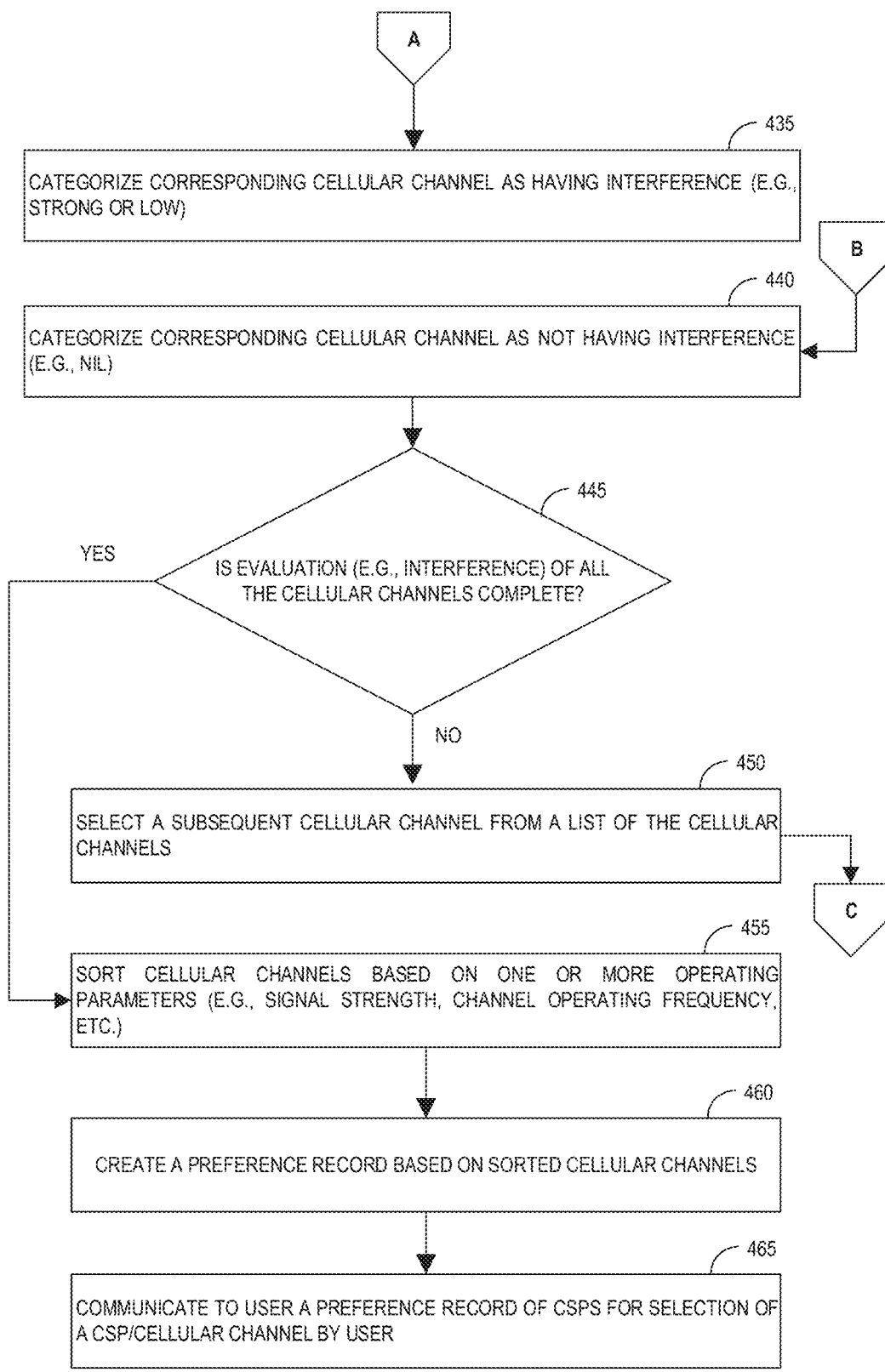
FIG. 4B illustrates a continuation of the example flow diagram shown in FIG. 4A, in accordance with the present subject matter.
Figure 5:
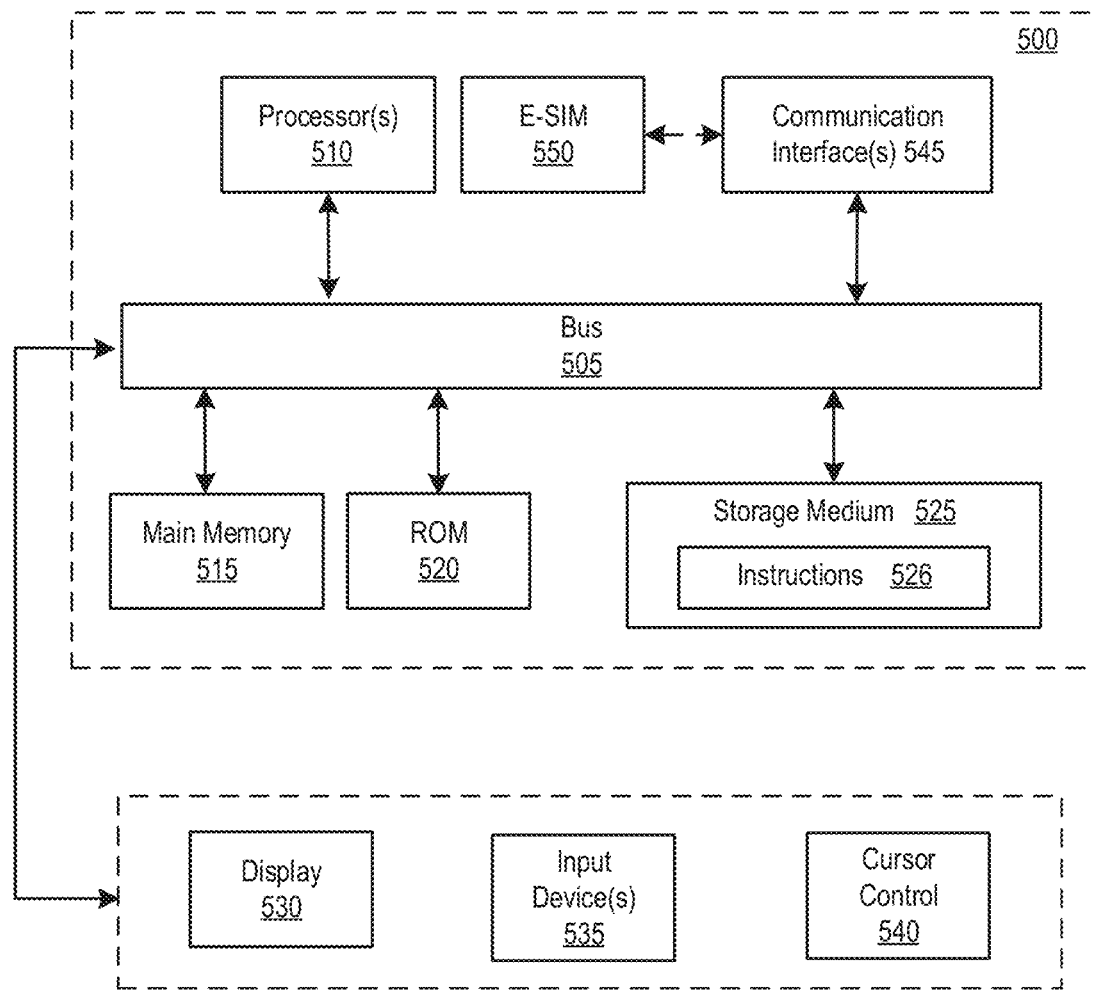
FIG. 5 depicts a schematic block diagram of an example computing device in which various examples described herein may be implemented.

In some examples, storage medium 210 may include additional instructions, for example, the instructions to implement some of the functionalities described in relation to an access point 200 as discussed in FIG. 4 or a computing device 500 of FIG. 5. In other examples, the functionalities of any of the instructions of storage medium 210 may be implemented in the form of electronic circuitry, in the form of executable instructions encoded on a machine-readable storage medium, or a combination thereof.

Processor 205 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processor can, for example, include single or multiple cores on a chip, multiple cores across multiple chips, multiple cores across multiple devices, or suitable combinations thereof.

Figure 3A:
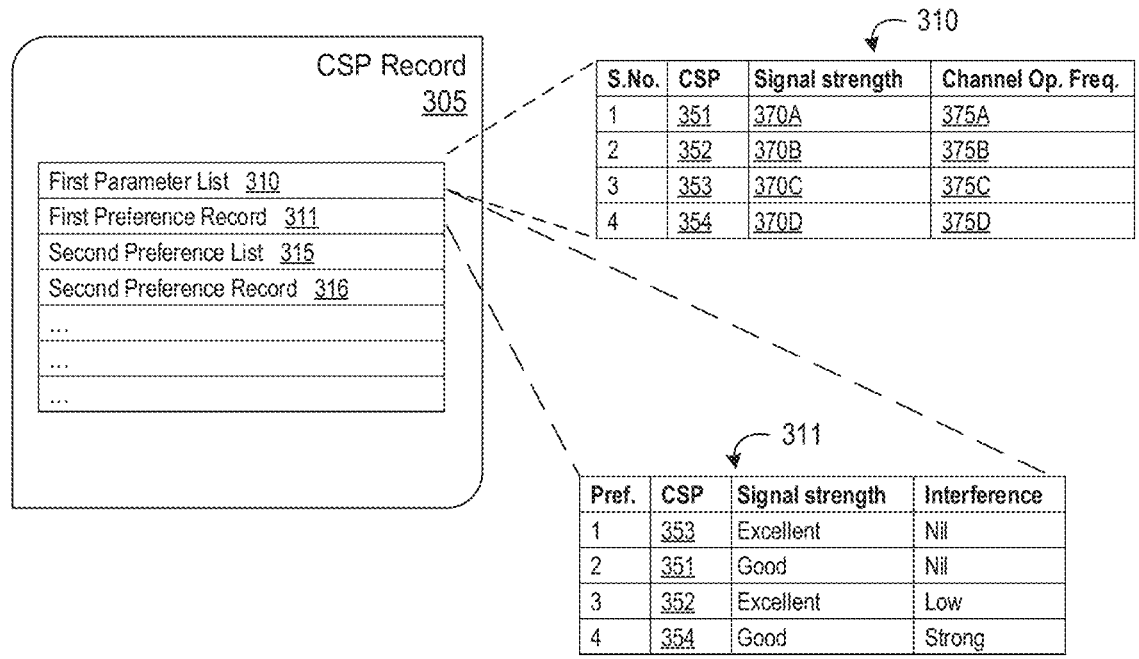
FIG. 3A illustrates a schematic view of a cellular service provider record, in accordance with an example of the present subject matter.
Figure 3B:
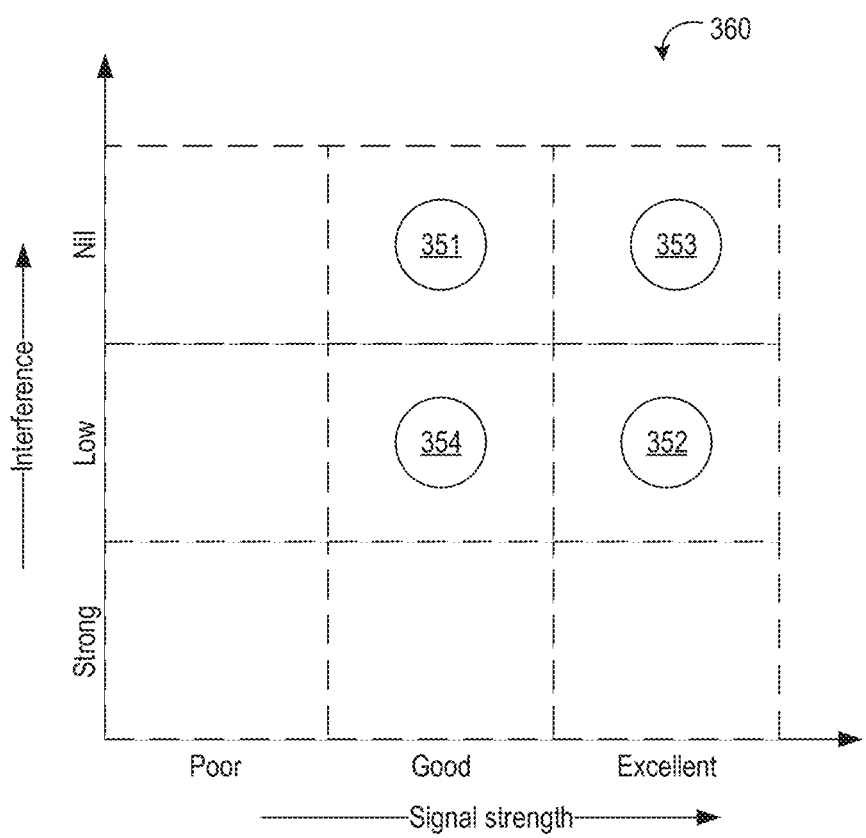
FIG. 3B illustrates an example representation of cellular service providers in a parameter graph, in accordance with the present subject matter.

FIG. 3A illustrates a schematic view of a CSP record 305. In some examples, the CSP record 305 may include entries made by an access point corresponding to identified CSPs. In some examples, a CSP record may be stored within the access point. In some other examples, a CSP record may be stored in an external storage such as a storage array, a server, a cloud-storage resource, etc. FIG. 3B illustrates an example representation of CSPs in a parameter graph. The parameters considered for FIG. 38 are signal strength and interference (determined based on channel operating frequency). In an example, CSP record 305 comprises a first parameter record 310 and a first preference record 311. An AP may scan for cellular channels from various cellular service providers in a location of AP, such as a first location (i.e., AP's geographical location). In the depicted example, the AP may have identified four cellular channels corresponding to four cellular service providers 351-354 that may be operating in the location of AP. For the identified cellular channels, the AP may record a set of operating parameters in the first parameter record 310. In further examples, the AP may measure and store operating parameters for each of the cellular channels the first parameter record 310, as part of the recording. For instance, the set of operating parameters may include a signal strength 370A-370D, a channel operating frequency 375A-375D, etc. One or more of the recorded operating parameters may be used for further analysis, as part of the evaluation of the cellular channels.

In some examples, operating parameters may be categorized based on corresponding threshold conditions. For example, signal strength, and/or channel operating frequency may be categorized during the process of evaluation of cellular channels. Based on the threshold value, the signal strength may be categorized under two categories. For example, based on a condition that measured/recorded signal strength satisfies (e.g., meets or exceed) a threshold signal condition (e.g., threshold value), then the signal strength is categorized as 'good.' If the recorded signal strength does not satisfy the threshold signal condition, then the signal strength may be categorized 'bad.' Similarly, the channel operating frequency may be categorized as 'high interference', or 'low interference' based on a channel threshold condition. The current example categorizes the operating parameters into two categories. In further examples, operating parameters may be categorized under more than two categories.

In some examples, a threshold value or threshold condition may be defined by manufacturer of an access point. In some other examples, various threshold categories may be defined by a manufacture, for example, high threshold, moderate threshold, or low threshold. The access point may be configured to automatically select a threshold category based on an algorithm/logic/code. In some other examples, a user may be provided an option to select a threshold category from a preset (e.g., three threshold categories from above) threshold categories.

For example, the signal strength and interference (that is determined based on channel operating frequency and/or signal strength) may be categorized as poor, good, or excellent and strong, low, or nil (i.e., three categories), respectively. 'Poor' may imply that signal strength is low, 'good' may imply that the signal strength is moderate, and 'excellent' may imply that the signal strength is strong. Similarly, interference is categorized into one of the three values, i.e., strong, low, and nil. Based on the categorization of operating parameters, the cellular service providers may be populated on graph 360 for evaluation, as per some examples. In the illustrated example, CSP 351 has excellent signal strength and nil/no interference. Similarly, other CSFs 352, 353, 354 are populated in graph 360 based on the categorized operating parameters illustrated in the first parameter record 310 (FIG. 3A).

In some examples, sorting may be done in two rounds. For example, sorting of cellular channels (i.e., CSPs) 351-354 may be performed based on a first characteristic (e.g., channel interference). The sorted channels may be selectively sorted (i.e., further sorted) based on a second characteristic (e.g., signal strength). The phrase "selectively sorted/selective sorting" may include further sorting among cellular channels having the same interference value. For example, CSFs 351-354 may be sorted based on channel interference. Those CSPs 351-354 with the same interference value may be further sorted based on other characteristics. For example, the CSFs 351 and 353 both have interference as 'nil'. These two CSPs may be further sorted (i.e., selective sorting) based on signal strength. The CSP 353 is signal strength categorized as 'excellent' is the most preferred/best-suited CSP with low interference. In the above example, one or more intermediate records may be created for storing and performing a sorting operation. The intermediate records may be stored in the CSP record 305 and are not illustrated for brevity.

In some further examples, the AP may evaluate the cellular channels based on the set of operating parameters that include a channel operating frequency $f_{cellular}$ and a wireless operating frequency $f_{wireless}$. For example, a frequency gap $f_{gap}$ between the cellular channel operating frequency $f_{cellular}$ and the wireless operating frequency $f_{wireless}$ may be determined, to evaluate channel interference. As discussed herein, "channel interference" may indicate interference of the channel operating frequency on the wireless frequency. In some examples, an interference threshold $f_{threshold}$ may be set by an administrator of AP, a manufacturer of AP, or by the user to determine channel interference. For example, a positive difference (i.e., absolute value) of the frequency gap $f_{gap}$ between the frequencies $f_{cellular}$, $f_{wireless}$ may be determined. The positive difference between the frequencies may be compared with the interference threshold. Following example equation (i.e., equation-1) provides absolute value of frequency gap between frequencies (i.e., $f_{cellular}$, $f_{wireless}$).

$$f_{gap} = |f_{cellular} - f_{wireless}| \quad (1)$$

Based on the frequency gap satisfying a criterion, a corresponding cellular channel may be determined as having no interference. For example, the criteria may include that the frequency gap may be greater than or equal to the interference threshold. Accordingly, cellular channels having a frequency gap equal to or greater than the frequency gap may be determined as having no interference from the wireless frequency. Whereas, if the frequency gap is less than the interference threshold, then the corresponding cellular channel may be determined as having interference.

In further examples, an interference level IL (e.g., numerical value) may be determined to determine interference. In some examples, interference level IL may be determined based on the following equation (i.e., equation-2). The interference level IL may include numerical values between 0 and 1 (inclusive of both 0 and 1. Based on the absolute value of frequency gap between the frequencies and threshold frequency, and the signal strength, the interference level may be measured. For example, based on the frequency gap being lower than the interference threshold, then the interference level maybe 0. Based on the frequency gap being equal to or greater than a threshold frequency, the interference level may be calculated by the following equation. In equation-2, 'k1' may be a first constant factor and 'k2' may be a second constant factor. The constant factors k1 & k2 are selected such that the interference level IL has a maximum value of 1. Based on values of interference level IL, the cellular channels may be sorted from most preferred to least preferred CSP.

$$IL = \begin{cases} 0; & \text{if } |f_{cellular} - f_{wireless}| > f_{threshold} \\ k1 \times \text{signal strength} \times \\ e^{-k2 \times (f_{cellular} - f_{wireless})^2}; & \text{if } |f_{cellular} - f_{wireless}| \leq f_{threshold} \end{cases} \quad (2)$$

In other words, for cellular channels with frequency gaps that are equal to or greater than a frequency threshold, the interference level IL may be determined. The interference level IL for a particular cellular channel may be a function of a first constant factor k1 a second constant factor k2, a signal strength of the cellular channel being evaluated, and a frequency gap (i.e., $f_{cellular}-f_{wireless}$). For example, the interference level IL may be determined based on a product of the first constant factor k1, the signal strength, and an exponential value of: a product of a negative value of the second constant factor k2 and a square of the frequency gap.

In further examples, the AP may sort cellular service providers based on a priority score PS. The priority score PS may be computed to sort the cellular channels and corresponding CSPs. The cellular channels may be sorted in a descending order based on the preference score PS. Below equation-3 may be an example equation for determining preference score PS.

$$PS = \text{Phy Rate}(\text{Signal strength, Mode}) \times (1-IL) \quad (3)$$

Preference score PS may be a function of the physical rate of the channel (Phy Rate) and interference level IL. For example, a physical rate may determine the speed at which data or bits are negotiated between two devices (e.g., cellular interface and CSP). In some examples, a physical rate may be determined based on the signal strength and mode of operation of the channel (in short, Mode). For example, based on the signal received from a base station of CSP and communication technology standard supported by the cellular interface, the physical rate of the cellular channel may be determined. In some examples, the capability of a cellular interface may be based on technology standards, such as 3G, 4G, 5G, etc. Interference level IL may be determined from equation-2. Using preference scores, the CSPs may be sorted based on one metric. In one example, the preference score PS may be determined by a product of: Phy Rate and a difference of interference level II with unity (i.e., 1-IL).

In some examples, the AP may evaluate and/or determine signal strength and channel interference for cellular channels. Based on signal strength and interference, the AP sorts cellular channels and corresponding CSPs in an order of preference. For example, the AP may suggest to a user CSP 351 as the most preferred CSP, followed by CSPs 353, 352, 354. The CSPs 351 and 353 may operate in frequency bands with nil/no interference with the wireless interface thereby offering seamless communication service to the client device(s). AP may provide a warning message to a user if the user selects a CSP with interference.

In some examples, the CSP record 305 may include the first preference record 311 that corresponds to a first location of AR The first preference record 311 may be stored in at least one of: the AP, an external storage device, or a cloud storage device.

Information contained on e-SIM may be industry-standard compliant and re-writable by all CSPs, meaning the user may have the flexibility to change from the current CSP to another CSP. In one example, the user may change to another CSP in the same location. The AP may evaluate the CSPs and update the first preference record. In another example, the user may have moved to a different location. The AP may perform evaluation and sort CSPs available in the new location (i.e., a second location) and create a second preference record. The user selects a CSP from the second preference record presented to the user.

In some examples, the CSP record 305, which may comprise one or more preference records corresponding to one or more localities at which the AP may have scanned for CSPs. In a further example, a preference record may correspond to a first location. Another preference record may correspond to the first location but CSPs are scanned for at a later time. In some examples, the CSP record 305 comprises a first parameter record 310 and a first preference record 311, a second parameter record 315 and a second preference record 316, etc. The first preference record 311 may correspond to a first location of the AP. The second preference record 316 may correspond to a second location of AP.

FIGS. 4A and 4B illustrate an example flow-diagram for a method 400 of operation of an access point (AP) for evaluating CSPs. Although the flow-diagram depicts a specific order of performance of certain functionalities, method 400 may not be limited to that order. For example, some of the functionalities shown in succession may be performed in a different order, may be executed concurrently or with partial concurrence, or a combination thereof. In some examples, functionalities described herein in relation to FIGS. 4A and 4B may be provided in combination with functionalities described herein in relation to any of FIGS. 1A, 1B, 2, 3A, and 3B. Method 400 may also comprise additional steps that are not shown. For example, the AP discussed herein may refer to the AP 105 (as shown in FIG. 1), the AP 200 (as shown in FIG. 2), or a computing device 500 (as shown in FIG. 5).

At 405, the AP may scan for cellular channels from various cellular service providers. The location of AP may refer to a physical or geographical location of AP. The AP may scan for cellular channels through a cellular interface of the AP. The AP may scan for frequency bands supported by the cellular interface. For example, a cellular interface may be 5G (i.e., fifth-generation technology standard for broadband cellular networks) compatible. Accordingly, supported frequencies may be scanned for the availability of service. In one example, the cellular channel may correspond to cellular uplink used by a user device(s) such as IoT devices. In another example, the cellular channel may cover both uplink and downlink frequencies. In some other examples, a cellular channel may be used in a duplex mode for both uplink and downlink connection.

At 410, based on a scan for cellular channels, the AP may identify cellular channels, corresponding to cellular service providers.

At 415, the AP may record a set of operating parameters for the cellular channels. The set of operating parameters may include, but are not limited to, a signal strength (e.g., measured in dB milliwatts), a channel operating frequency (e.g., measured in hertz/Hz). Channel operating frequency may also be referred to as 'band.' In some examples, a channel operating frequency may have to be further evaluated for determining preference.

At 420, the AP may identify one or more wireless operating frequencies used by the wireless interface of the AP. For example, the wireless interface may use 2.4 GHz, 5 GHz, 6 GHz, 900 MHz, 868 MHz, or any other frequency band. Client devices or Internet of Things (IoT) devices may connect to any frequency band for communication and data transfer.

Subsequently, the AP may evaluate the cellular channels based on the set of operating parameters. For example, at 425, the AP may determine the frequency gap between a channel operating frequency and a Wireless operating frequency. In some examples, the wireless interface is capable of operating in more than one frequency band. For example, a wireless interface may operate simultaneously on two or more wireless frequencies (e.g., a Wi-Fi interface operating in a 2.4 Ghz frequency band and a 5 Ghz frequency band). In such instances, based on the determination by the AP that the wireless interface is capable of operating in more than one wireless frequency simultaneously, the AP may evaluate available CSPs against the two or more wireless frequencies. For example, the wireless interface of the AP may have two wireless frequencies, for example, a first wireless frequency and a second wireless frequency. For the first wireless frequency, a first CSP may be determined to be best suited to work in conjunction based on the evaluation. Similarly, a second CSP may be determined to be best suited based on the evaluation. In such instances, the AP may select a CSP (from the two CSPs) based characteristics including a signal strength of channel, mode of operation of the channel (e.g., GSM, COMA, 3G, 4G, 4G LTE, 5G, etc.), etc. In some further examples, the characteristics may be provided with weightage (e.g., signal strength at 40% and mode of operation of the channel at 60%) to select the most preferred CSP for the user to work in conjunction with the two or more wireless channels.

At 430, the AP may determine whether a frequency gap satisfies (e.g., meets or exceeds) an interference threshold. The interference threshold may be determined based on at least of Wireless interface, a cellular interface, operating region, manufacture preference, etc. The frequency gap may be used to determine a channel interference with reference to the interference threshold, as elaborated in equation-1. In some examples, channels may be categorized based on channel inference using frequency gap (i.e., interference—Yes/No). In further examples, instead of using a single threshold for categorizing channels into two categories, two or more threshold values may be used for categorizing channels into multiple levels. For example, two threshold values may be used for each of signal strength of channel and channel operating frequency to categorize channels in three categories, as illustrated and discussed in FIG. 3B.

Based on the determination, at 430, the AP may classify a cellular channel as having interference or not having interference with the wireless interface. For example, at 435, the AP may categorize a cellular channel as having interference, based on the cellular channel satisfying a condition for interference (i.e., interference threshold). Similarly, at 440, the AP may categorize a cellular channel as not having interference, based on the cellular channel not satisfying a condition for interference.

In some further examples, at 435, the AP may categorize a cellular channel as nil/no interference. In some examples herein, 'no interference' may imply that a significant gap may be available between a channel operating frequency and a Wireless operating frequency. 'Low interference' may imply that there may be an acceptable level of interference between the channel operating frequency and the Wireless operating frequency.

Similar to the above categorization, at 440, the AP may categorize a cellular channel as having a strong interference. As the term may imply, the Wireless interface may experience significant interference, thereby affecting communication services to client devices.

At 445, the AP may determine if evaluation of frequency gap is performed for all available cellular channels. Based on a determination that one or more cellular channels have to undergo evaluation, at 450, the AP may select a subsequent channel and perform an evaluation. Whereas, based on a determination that all cellular channels may be evaluated, the AP may move to 455. In some examples, evaluation of cellular channels may include analysis of parameters such as signal strength. For example, the AP may evaluate cellular channels that have satisfied a non-interference condition, may further be evaluated based on signal strength.

At 460, the AP may create a preference record based on the evaluation performed in one or more aforementioned steps. Referring example of FIG. 3A, CSPs 351, 352, 353, and 354 may be sorted in a preference record. CSPs 351, 353 may not have interference with the Wireless interface. The sorted record may be presented to a user through a user interface. At 465, a user may be communicated information based on the preference record for the selection of a CSP.

FIG. 5 depicts a schematic block diagram of an example computing device 500 in which various examples described herein may be implemented. In some examples, the computing device 500 may include a cellular interface and a wireless interface. Further, the computing device 500 may include a bus 505 or other communication mechanisms for communicating information, processors such as one or more hardware processor(s) 510 coupled with bus 505 for processing information. The hardware processor(s) 510 (hereinafter, referred to as 'processors' for brevity) may be a general-purpose microprocessor(s).

The computing device 500 also includes a main memory 515, such as random-access memory (RAM), cache, and/or other dynamic storage mediums, coupled to the bus 505 for storing information and instructions to be executed by the processor 510. The main memory 515 also may be used for storing temporary variables or other intermediate information during the execution of instructions to be executed by processor 510.

The computing device 500 further includes a read-only memory (ROM) 520 or other static storage medium coupled to bus 505 for storing static information and instructions for processor 510. A storage medium 525, such as a magnetic disk, optical disk, or Universal Serial Bus (USB) thumb drive (Flash drive), etc., may be provided and coupled to bus 505 for storing information and instructions. For example, the various instructions that may be required for method 400 may be stored at one or more of the main memory 515, the ROM 520, and the storage medium 525. In further examples, the storage medium may be a non-transitory type. The CSP record 305 (as shown in FIG. 3A) may also be stored in one or more of the main memory 515, the ROM 520, and the storage medium 525. The processor 510 may fetch, decode, and execute the instructions stored at the main memory 515, the ROM 520, and the storage medium 525 to perform the techniques disclosed herein. For example, the instructions may include instructions 220-240 as discussed in FIG. 2, one or more steps as discussed in FIGS. 3A and 3B, FIGS. 4A and 4B, or a combination thereof.

In some examples, the storage medium 525 may include instructions 526 that when executed by the processor 510 cause the processor to scan for cellular channels from various cellular service providers. Instructions that cause the processor 510 to identify the cellular channels corresponding to the cellular service providers. Instruction that causes the processor also to record a set of operating parameters for the cellular channels. In some examples, the set of operating parameters include a signal strength of a channel and a channel operating frequency. The instructions that cause the processor 510 to evaluate the cellular channels based on the signal strength of the channel and the channel operating frequency. The instructions that cause the processor also to sort the cellular service providers based on the evaluation of the cellular channels, in an order of preference to work in conjunction with a wireless interface.

The computing device 500 may be coupled via bus 505 to a display 530, such as a liquid crystal display (LCD) (or touch screen), for displaying information (e.g., a user interface) to a computer user. An input device 535, including alphanumeric and other keys, may be coupled to bus 505 for communicating information and command selections to processor 510. Another type of user input device is cursor control 540, such as a mouse, a trackball, or cursor direction keys for communicating direction information and command selections to processor 510 and for controlling cursor movement on display 530. In some examples, the same direction information and command selections as cursor control may be implemented via receiving touches on a touch screen without a cursor.

This and other modules may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables.

In general, the terms "component," "system," "part," "device," "database," data store," and the like, as used herein, may refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or themselves, and/or maybe invoked in response to detected events or interrupts. Software components configured for execution on computing devices may be provided on a computer-readable medium, such as a compact disc, digital video disc, flash drive, magnetic disc, or any other tangible medium, or as a digital download (and may be originally stored in a compressed or installable format that requires installation, decompression or decryption before execution). Such software code may be stored, partially or fully, on a memory device of the executing computing device, for execution by the computing device. Software instructions may be embedded in firmware, such as an Erasable Programmable Read-Only Memory (EPROM). It will be further appreciated that hardware components may be comprised of connected logic units, such as gates and flip-flops, and/or maybe comprised of programmable units, such as programmable gate arrays or processors.

The computing device 500 may implement the techniques described herein using customized hard-wired logic, one or more Application-Specific Integrated Circuits (ASICs) or Field Programmable Gate Arrays (FPGAs), firmware, and/or program logic which in combination with the computer system causes or programs computing device 500 to be a special-purpose machine. According to some examples, the techniques herein may be performed by computing device 500 in response to processor(s) 510 executing one or more sequences of one or more instructions contained in main memory 515. Such instructions may be read into main memory 515 from another storage medium, such as storage medium 525. Execution of the sequences of instructions contained in main memory 515 causes processor(s) 510 to perform the process type steps described herein. In alternative examples, hard-wired circuitry may be used in place of or in combination with software instructions.

The computing device 500 also includes a communication/network interface 545 coupled to bus 505. The network interface 545 provides two-way data communication on one or more networks. The computing device 500 may send messages and receive data, including program code, through the network(s), network link, and the network interface 545. In the Internet example, a server might transmit a requested code for an application program through the Internet, the Internet Service Provider (ISP), the local network, and the network interface 545. The received code may be executed by processor 510 as it is received, and/or stored in storage medium 525, or other non-volatile storage for later execution. The communication interface 545 may further include a cellular interface 115 and a wireless interface 120 (as shown in FIG. 1A). Further, the computing device 500 may include an e-SIM 550 that works in conjunction with the communication interface 545.

Each of the processes, methods and algorithms described in the preceding sections may be embodied in, and fully or partially automated by, code components executed by one or more computer systems or computer processors comprising computer hardware. One or more computer systems or computer processors may also operate to support the performance of the relevant operations in a "cloud computing" environment or as a "software as a service" (SaaS). The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process type blocks may be omitted in some implementations. The methods and processes described herein are also not limited to any particular sequence, and the blocks or states relating thereto may be performed in other sequences that are appropriate or may be performed in parallel, or some other manner. Blocks or states may be added to or removed from the disclosed example examples. The performance of certain operations or processes may be distributed among computer systems or computer processors, not only residing within a single machine but deployed across several machines.

As used herein, a circuit might be implemented utilizing any form of hardware, software, or a combination thereof. For example, one or more processors, controllers, ASICs, Programmable Logic Arrays (PLAs), Programmable Array Logic (PALs), Complex Programmable Logic Device (CPLDs), FPGAs, logical components, software routines, or other mechanisms might be implemented to make up a circuit. In an implementation, the various circuits described herein might be implemented as discrete circuits or the functions and features described may be shared in part or total among one or more circuits. Even though various features or parts of functionality may be individually described or claimed as separate circuits, these features and functionality may be shared among one or more common circuits, and such description shall not require or imply that separate circuits are required to implement such features or functionality. Where a circuit is implemented in whole or in part using software, such software may be implemented to operate with a computing or processing system capable of carrying out the functionality described with respect thereto, such as computing device 500.

Device 105, 200, 500 may include hardware and/or combinations of hardware and programming to perform functions provided herein. The terms—converter part or comparator part includes a circuit, module, and/or combination of circuit/modules and software. While certain examples have been shown and described above, various changes in form and details may be made. Certain features that have been described in relation to one example and/or method may be related to other examples. In other words, flow diagrams, methods, features, components, and/or properties described in relation to one example may be useful in other examples. Furthermore, it should be appreciated that the systems and methods described herein may include various combinations and/or sub-combinations of the components and/or features of the different examples described. Thus, features described with reference to one or more examples can be combined with other examples described herein.

The terminology used herein is to describe various examples and is not intended to be limiting. As used herein, the singular forms "a," "an," and "the" are intended to include the plural forms as well, unless the context clearly indicates otherwise. The term "another," as used herein, is defined as at least a second or more. The term "and/or" as used herein refers to and encompasses any and all possible combinations of one or more of the associated recorded items. As used herein, the term "includes" means includes but is not limited to, the term "including" means including but not limited to. The term "based on" means based at least in part on.

Certain examples of the present disclosure are described with reference to the features illustrated in FIGS. 1A-5. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples. Furthermore, the sequence of operations is described in connection with FIGS. 1A-5 are examples and are not intended to be limiting. Additional or fewer operations or combinations of operations may be used or may vary without departing from the scope of the disclosed examples. Thus, the present subject matter merely sets forth examples of implementations, and many variations and modifications may be made to the described examples. Such modifications and variations are intended to be included within the scope of this disclosure and protected by the appended claims.

All of the features disclosed in this specification (including any appended claims, abstract, and drawings), and/or all of the elements of any method or process so disclosed, may be combined in any combination, except combinations where at least some of such features and/or elements are mutually exclusive.

We claim:

1. A method comprising:
scanning, by an access point (AP), for cellular channels from various cellular service providers;
identifying, by the AP, the cellular channels corresponding to the cellular service providers;
recording, by the AP, a set of operating parameters for the identified cellular channels, wherein the set of operating parameters include a channel operating frequency;
based on the set of operating parameters that are recorded, determining, by the AP, an interference level based on a frequency gap between the channel operating frequency and a wireless operating frequency, wherein the interference level is determined based on a product of a first constant factor, a signal strength of a channel, and an exponential value of a product of a negative value of a second constant factor and a square of the frequency gap;
determining whether the interference level satisfies a threshold condition; and
upon satisfying the threshold condition, sorting, by the AP, the cellular service providers corresponding to the cellular channels, in an order of preference to work in conjunction with a wireless interface of AP.

2. The method of claim 1, wherein determining the interference level includes:
determining, by the AP, an absolute value of the frequency gap between the wireless operating frequency and the channel operating frequency of a cellular channel.

3. The method of claim 1, wherein the sorting includes:
sorting, by the AP, the cellular channels based on a determined channel interference, wherein the channel interference is determined based on a frequency gap between a channel operating frequency and a wireless operating frequency, satisfying a threshold condition; and
selectively sorting, by the AP, the sorted cellular channels based on a signal strength of a channel and the determined channel interference.

4. The method of claim 1, wherein the sorting includes:
sorting, by the AP, the cellular channels based on an interference level, wherein the interference level is determined based on a signal strength of a channel, the channel operating frequency, and a wireless operating frequency of the wireless interface.

5. The method of claim 1, further comprising:
determining, by the AP, a preference score for each cellular channel, out of the cellular channels; and
sorting, by the AP, the cellular channels and the corresponding cellular service providers based on the determined preference scores of the cellular channels.

6. The method of claim 5, wherein the preference score for a cellular channel is determined by calculating a product of a physical rate of a channel, and a difference between unity and the interference level of the cellular channel.

7. The method of claim 1, wherein the recording includes:
measuring, by the AP, the set of operating parameters for each cellular channel out of the identified cellular channels; and
storing, by the AP, the measured operating parameters in a parameter record, corresponding to a location of the AP.

8. The method of claim 1, further comprising:
communicating, by the AP, to a user device, a preference record comprising the sorted cellular service providers, for selection of a cellular service provider by a user.

9. A non-transitory storage medium comprising instructions, the instructions executable by a processor to:
scan for cellular channels from various cellular service providers;
identify the cellular channels corresponding to the cellular service providers;
record a set of operating parameters for the identified cellular channels;
evaluate the cellular channels based on the set of operating parameters, wherein the operating parameters include a channel operating frequency, and the instructions executable by the processor to:
identify a wireless operating frequency of a wireless interface; and
determine a frequency gap between the channel operating frequency and the wireless operating frequency;
determine an interference level based on the frequency gap, wherein the interference level is determined based on a product of a first constant factor, a signal strength of a channel, and an exponential value of a product of a negative value of a second constant factor and a square of the frequency gap;
determine whether the interference level satisfies a threshold condition; and
sort the cellular service providers based on satisfying the threshold condition, in an order of preference to work in conjunction with the wireless interface.

10. The non-transitory storage medium of claim 9, wherein the instructions to record, include instructions to:
measure and store the set of operating parameters in a parameter record, wherein the parameter record is stored in a cellular service provider (CSP) record.

11. The non-transitory storage medium of claim 9, wherein the instructions to evaluate, include instructions to:
retrieve the set of operating parameters from a parameter record;
evaluate one or more operating parameters based on corresponding one or more threshold values; and
record and store the evaluated operating parameters in a preference record.

12. The non-transitory storage medium of claim 9, wherein the instructions to sort, include instructions to:
sort the cellular service providers based on at least one of the evaluated operating parameters or the recorded operating parameters.

13. The non-transitory storage medium of claim 9, comprising instructions to:
communicate the sorted cellular service providers, in an order of preference, to a user device, for selection of a cellular service provider.

14. A computing device comprising:
a wireless interface;
a processor; and
a non-transitory storage medium including instructions, the instructions executable by a processor causing the processor to:
scan for cellular channels from various cellular service providers;
identify the cellular channels corresponding to the cellular service providers;
record a set of operating parameters for the cellular channels, wherein the set of operating parameters include a signal strength of a channel and a channel operating frequency;
determine an interference level based on a frequency gap between the channel operating frequency and a wireless operating frequency, wherein the interference level is determined based on a product of a first constant factor, a signal strength of a channel, and an exponential value of a product of a negative value of a second constant factor and a square of the frequency gap;
determine whether the interference level satisfies a threshold condition; and
sort the cellular service providers based on satisfying the threshold condition, in an order of preference to work in conjunction with the wireless interface.

15. The computing device of claim 14, further comprising:
a communication interface device comprising:
a cellular interface, wherein the computing device communicatively connects to a cellular channel through the cellular interface, wherein the processor executes one or more instructions, causing the processor to:
determine the frequency gap between the channel operating frequency and the wireless operating frequency of the wireless interface.

16. The computing device of claim 15, further comprising:
an embedded-Subscriber Identity Module (e-SIM), wherein
the e-SIM is configured to work in conjunction with the cellular interface.

17. The computing device of claim 16, wherein the computing device includes a physical Subscriber Identity Module capability that is configured to work independently of the e-SIM.

18. The computing device of claim 14, wherein the set of operating parameters further include at least one of a physical rate of a channel or a mode of operation of a channel.

* * * * *